(12) United States Patent
Koga et al.

(10) Patent No.: US 6,370,468 B1
(45) Date of Patent: Apr. 9, 2002

(54) SPEED RATIO CONTROL DEVICE FOR VEHICLE

(75) Inventors: Masato Koga, Atsugi; Mitsuru Watanabe, Hadano; Satoshi Takizawa, Yokohama; Masatoshi Akanuma, Fujisawa; Shigeki Shimanaka, Hadano; Hiroyasu Tanaka, Zama; Junya Takayama, Oomiya, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/672,875

(22) Filed: Sep. 29, 2000

(30) Foreign Application Priority Data

Sep. 30, 1999 (JP) .......................... 11-280362
Sep. 30, 1999 (JP) .......................... 11-280363

(51) Int. Cl.[7] .......................... F16H 61/00; B60K 41/14
(52) U.S. Cl. .......................... 701/91; 701/51; 701/61; 701/91; 477/43; 477/44; 477/45; 477/46; 476/10; 475/186
(58) Field of Search .......................... 701/91, 51, 70, 701/60, 61, 54; 477/49, 68, 85, 45, 34, 46, 78, 43, 48

(56) References Cited

U.S. PATENT DOCUMENTS

| | | | | |
|---|---|---|---|---|
| 5,240,094 A | | 8/1993 | Suzuki | 192/4 A |
| 5,383,125 A | | 1/1995 | Hibi | 364/426.03 |
| 6,146,307 A | * | 11/2000 | Takizawa et al. | 477/37 |
| 6,157,884 A | * | 12/2000 | Narita et al. | 701/51 |
| 6,165,101 A | * | 12/2000 | Takizawa et al. | 477/37 |
| 6,174,261 B1 | * | 1/2001 | Watanabe et al. | 477/43 |
| 6,183,390 B1 | * | 2/2001 | Koga et al. | 477/37 |

FOREIGN PATENT DOCUMENTS

| | | |
|---|---|---|
| DE | 43 01 591 | 7/1993 |
| JP | 2-234851 | 9/1990 |

* cited by examiner

Primary Examiner—Jacques H. Louis-Jacques
Assistant Examiner—Tuan C To
(74) Attorney, Agent, or Firm—Foley & Lardner

(57) ABSTRACT

When a slip control system starts operating, a vehicle speed VSP used for speed change control is simultaneously changed over from a sensor detected vehicle speed VSPSEN to an estimated vehicle speed VSPFL. On the other hand, when the slip control system has stopped, it is first determined whether a speed ratio variation amount, due to the change-over of the vehicle speed used for speed change control from the estimated vehicle speed VSPFL to the sensor detected vehicle speed VSPSEN, is less than a permissible amount. When it is determined that the speed ratio variation amount is smaller than the permissible amount, the vehicle speed used for speed change control is changed over from the estimated vehicle speed VSPFL to the sensor detected vehicle speed VSPSEN. By performing this change-over, a sharp variation of the vehicle speed used for speed change control is suppressed, and a sharp variation of the speed ratio leading to shocks or slipping is suppressed.

6 Claims, 6 Drawing Sheets

SPEED RATIO CONTROL DEVICE FOR VEHICLE

FIELD OF THE INVENTION

The present invention relates to speed ratio control of a vehicle equipped with a slip control system and a continuously variable transmission (CVT).

BACKGROUND OF THE INVENTION

When slip control systems, such as an anti-lock brake system (ABS) or a traction control system (TCS), are operating, a braking force or drive force fluctuates and a sensor detected vehicle speed (=drive wheel speed) fluctuates. Therefore, if speed ratio control is performed based on the sensor detected vehicle speed, a speed ratio may vary suddenly. If the speed ratio varies suddenly during operation of a slip control system, the effectiveness of slip suppression by the slip control system will decline.

In JP-A-H2-234851 published by the Japanese Patent Office in 1990, a technique is disclosed of preventing a sudden change of speed ratio so as to prevent the decline of slip suppression by performing speed ratio control based not on the sensor detected vehicle speed, but on an estimated vehicle speed (=driven wheel speed).

SUMMARY OF THE INVENTION

However, when the slip control system stops, the aforesaid speed ratio controller immediately changes over the vehicle speed used for speed change control from the estimated vehicle speed to the sensor detected vehicle speed. When the difference between the estimated vehicle speed and sensor detected vehicle speed is large, the vehicle speed used for speed ratio control varies sharply, and as a result the speed ratio varies sharply. This sharp variation of the speed ratio causes the vehicle to suffer a shock or causes it to slip again.

It is therefore an object of this invention to prevent a sharp variation of speed ratio when a slip control system has stopped, and to prevent the occurrence of shocks or the recurrence of slipping.

In order to achieve above object, the present invention provides a speed ratio control device used for a vehicle comprising a continuously variable transmission and a slip control system which controls a slip of a driving wheel by controlling either of braking force and driving force. The control device comprises a sensor which detects a vehicle speed, an actuator which changes a speed ratio of the transmission, and a microprocessor programmed to estimate a vehicle speed based on a running state, compute a target speed ratio of the transmission based on the sensor detected vehicle speed when the slip control system is not operating, compute the target speed ratio of the transmission based on the estimated vehicle speed when the slip control system is operating, and control the actuator so that the speed ratio of the transmission approaches the target speed ratio. The microprocessor is further programmed to determine whether, when the slip control system has stopped, a speed ratio variation amount due to a change-over of the vehicle speed used for speed change control from the estimated vehicle speed to the sensor detected vehicle speed, is less than a permissible amount, and when it is determined that the speed ratio variation amount is less than the permissible amount, to change over the vehicle speed used for speed change control from the estimated vehicle speed to the sensor detected vehicle speed.

The details as well as other features and advantages of this invention are set forth in the remainder of the specification and are shown in the accompanying drawings.

DESCRIPTION OF THE PREFERRED EMBODIMENTS

Figure 1:
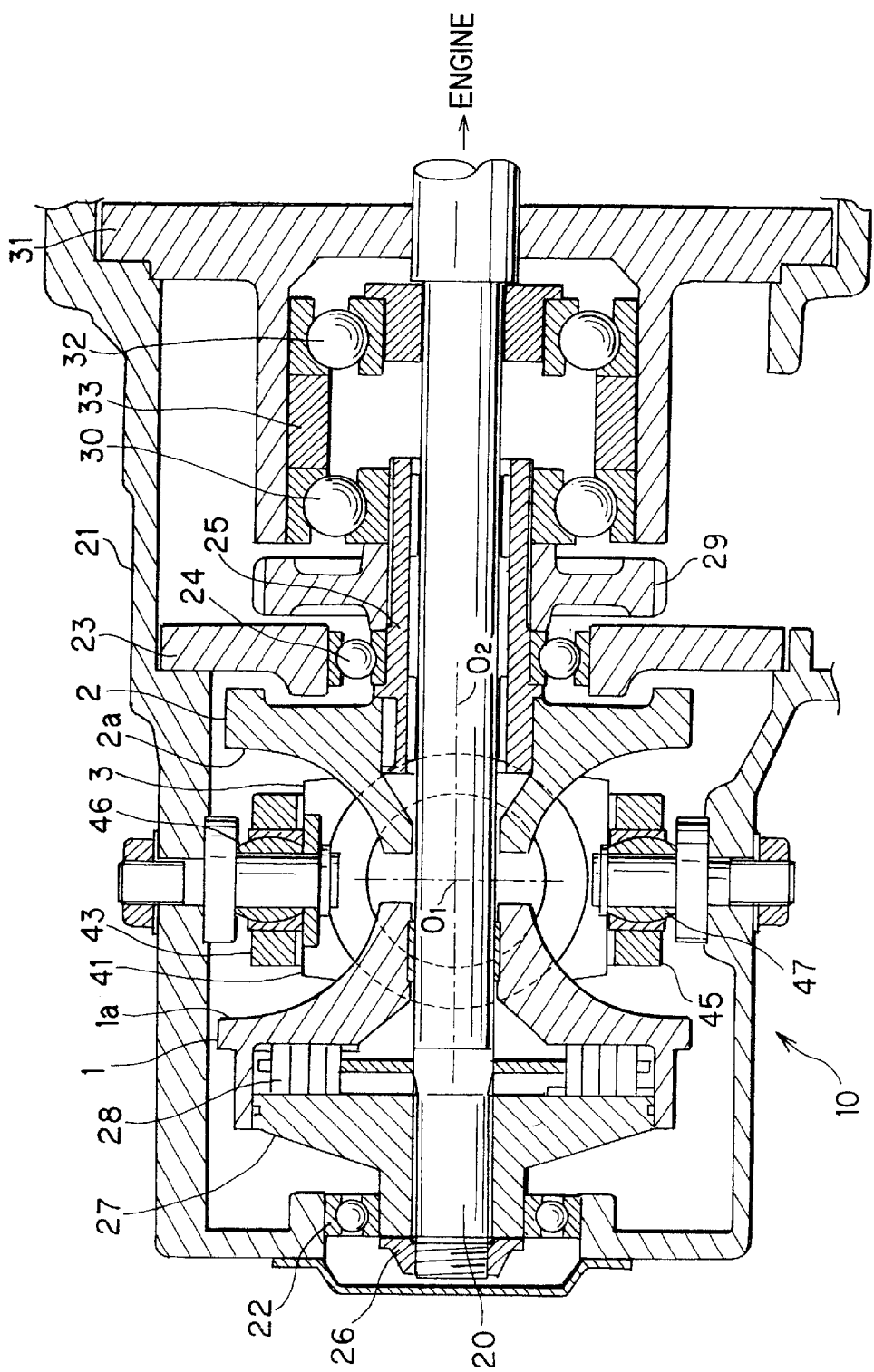
FIG. 1 is a longitudinal cross-sectional view of a toroidal continuously variable transmission according to this invention.

Referring to FIG. 1 of the drawings, a toroidal continuously variable transmission (CVT) 10 according to this invention comprises an input shaft 20 connected to an engine, not shown, via a torque converter. One end of the input shaft 20 is supported by a bearing 22 in a transmission case 21, and the middle is supported via a bearing 24 and a hollow output shaft 25 in an intermediate wall 23 of the transmission case 21.

An input disk 1 is supported by the input shaft 20. An output disk 2 is supported by the output shaft 25. The input disk 1 and output disk 2 are arranged so that their toroidal curved surfaces 1a, 2a face each other.

A pair of power rollers 3 disposed on either side of the input shaft 20 are gripped between the surfaces 1a and 2a.

In order to grip the power rollers 3 between the input disk 1 and output disk 2, a nut 26 is tightened at the tip of the input shaft 20. The nut 26 is tightened so that a cam disk 27 does not fall out of the input shaft 20. Cam rollers 28 are provided between the cam disc 27 and the input disk 1. The rotation of the input shaft 20 is transmitted to the input disk 1 via the cam rollers 28.

The rotation of the input disk 1 is transmitted to the output disk 2 via the power rollers 3. The cam rollers 28 generate a thrust force proportional to the transmitting torque, and grip the power rollers 3 between the input disk 1 and output disk 2.

The output disk 2 is spline jointed to the output shaft 25. An output gear 29 is fixed on the output shaft 25.

The output shaft 25 is supported by a cover 31 of the transmission case 21 via a radial thrust bearing 30. The input shaft 20 is supported by the cover 31 via a radial thrust bearing 32. The bearings 30, 32 cannot approach each other due to a spacer 33. Further, the bearings 30, 32 respectively contact an output gear 29 and the input shaft 20, and cannot move away from each other.

Therefore, the thrust force which acts on the input disk 1 and the output disk 2 due to the cam rollers 28 is cancelled at the spacers 33, and does not act on the transmission case 21.

Figure 2:
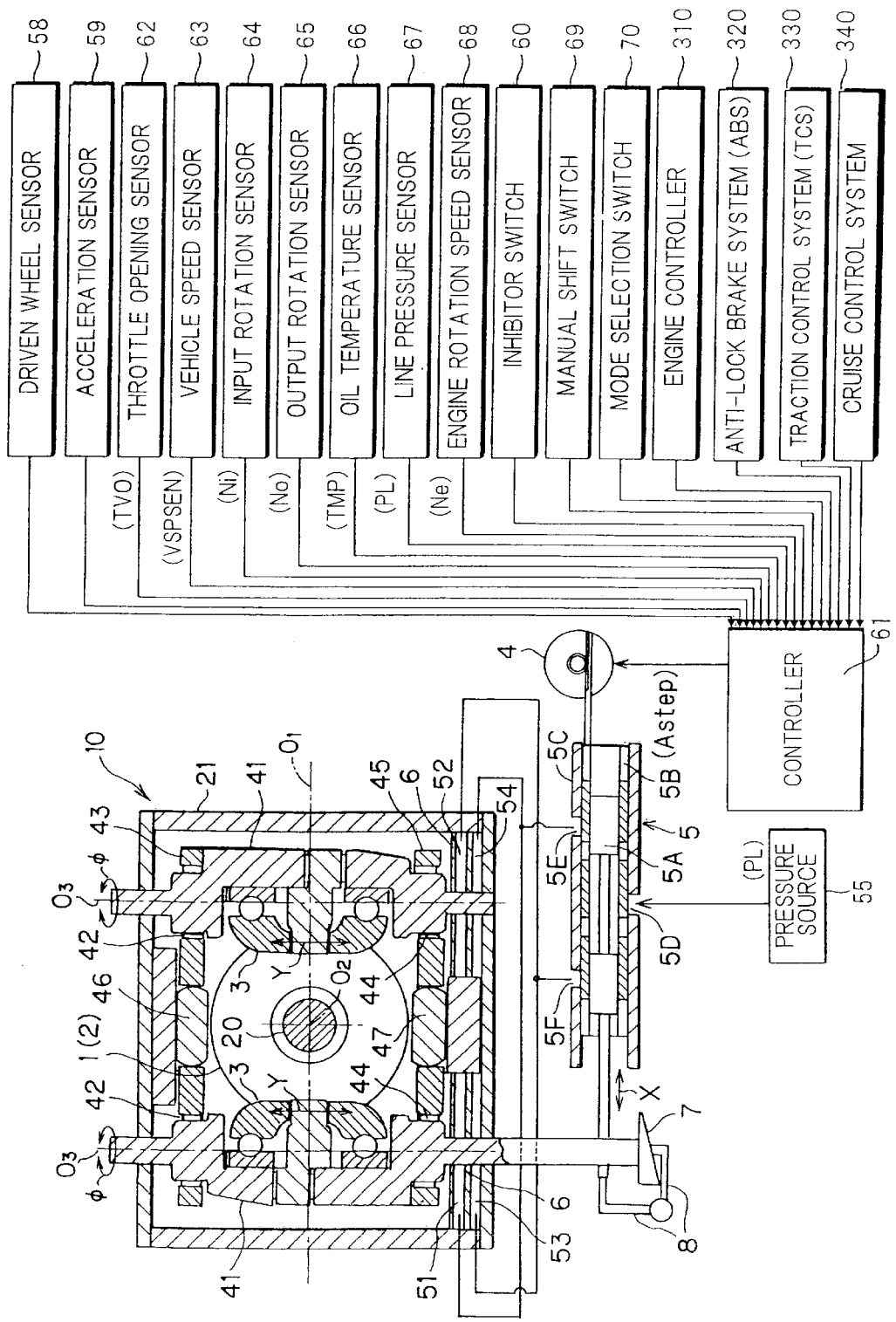
FIG. 2 is a traverse cross-sectional view of the transmission, and a schematic diagram of a speed ratio control device.

The power rollers 3 are supported free to rotate by trunnions 41, as shown in FIG. 2. The upper ends of the trunnions 41 are joined to an upper link 43 via a spherical joint 42 so that they are free to rotate and free to pivot, and their lower ends are joined to a lower link 45 via a spherical joint 44 so that they are free to rotate and free to pivot.

The upper link 43 and the lower link 45 are supported with their centers free to pivot on spherical joints 46, 47, and the trunnions 41 can be displaced vertically in synchronism in mutually opposite directions.

The speed ratio control device of the aforesaid transmission 10 will now be described referring to FIG. 2.

A piston 6 for displacing the trunnion 41 in a vertical direction is provided at each trunnion 41. Upper chambers 51, 52 and lower chambers 53, 54 are respectively formed on either side of these pistons 6. A speed ratio control valve 5 for controlling the displacement of each piston 6 is provided.

The speed ratio control valve 5 comprises a spool 5A, sleeve 5B and valve case 5C. The spool 5A and sleeve 5B fit together so that they are free to slide relative to each other. The sleeve 5B fits in the valve case 5C so that they are free to slide relative to each other.

A port 5D of the speed ratio control valve 5 is connected to a pressure source 55. A port 5E of the speed ratio control valve 5 is connected to the piston chambers 51, 54. A port 5F is connected to the piston chambers 52, 53.

The spool 5A operates together with a precess cam 7 fixed to the lower end of one of the trunnions 41 via a link 8. The sleeve 5B is engaged with a step motor 4 by a rack and pinion.

An operating command to the speed ratio control valve 5 is supplied as a displacement to the outer sleeve 5B by the step motor 4.

If the sleeve 5B displaces from the neutral position relative to the spool 5A due to this operating command, for example to the position shown in FIG. 2, the speed ratio control valve 5 will open, a fluid pressure (line pressure PL) will be supplied to the chambers 52, 53 from the pressure source 55, and the other chambers 51, 54 will be drained. The trunnions 41 then displace in mutually opposite directions up and down due to the pistons 6.

On the other hand, if the sleeve 5B displaces from the neutral position relative to the spool 5A in the reverse direction, the speed ratio control valve 5 will open, a fluid pressure will be supplied to the chambers 51, 54 from the pressure source 55, and the other chambers 52, 53 will be drained. The trunnions 41 then displace in mutually opposite directions up and down due to the pistons 6, 6.

As a result, the power rollers 3 are offset from the position where the rotation axis shaft $O_1$ intersects the rotation axis $O_2$ of the disks 1 and 2. The offset power rollers 3 receive a force from the disks 1 and 2, and gyrate around the rotation axis $O_3$ which is perpendicular to the axis $O_1$ so as to realize continuous variable speed change.

The precess cam 7 provided on a lower end of one of the trunnions 41 performs mechanical feedback of an offset Y and gyration angle $\phi$ of the trunnion 41 and power roller 3 as a displacement X of the spool 5A via the link 8.

When a speed ratio command value corresponding to a command value Astep to the step motor 4 is achieved by a continuously variable speed change, the spool 5A is returned to the neutral position relative to the sleeve 5B by the aforesaid mechanical feedback. Simultaneously, the power rollers 3 are returned to a position where the rotation axis $O_1$ intersects the rotation axis $O_2$ of the disks 1 and 2, thereby maintaining the aforesaid speed ratio command value.

In order to make the gyration angle $\phi$ of the power roller 3 a value corresponding to the speed ratio command value, it is sufficient for the precess cam 7 to feed back the gyration angle $\phi$ of the power roller 3. However, in order to prevent the speed ratio control from hunting, the offset Y of the power roller 3 is also fed back.

The command value Astep to the step motor 4 is determined by the controller 61.

The controller 61 comprises a microprocessor, read only memory, random access memory and input/output interface, and the following signals are input to the controller 61 as shown in FIG. 2.

driven wheel speed signal from a driven wheel speed sensor 58 acceleration signal from an acceleration sensor 59 throttle opening signal TVO from a throttle opening sensor 62 sensor detected vehicle speed signal VSPSEN from a vehicle speed sensor 63 transmission input rotation speed signal Ni (or engine rotation speed signal Ne) from an input rotation sensor 64 transmission output rotation speed signal No from an output rotation sensor 65 transmission oil temperature signal TMP from an oil temperature sensor 66 line pressure signal PL from a line pressure sensor 67 engine rotation speed signal Ne from an engine rotation speed sensor 68 shift lever position signal from an inhibitor switch 60 up-shift signal and down-shift signal from a manual shift switch 69 selected mode signal from a mode selection switch 70 torque-down signal from an engine controller 310 signal showing an operating state of an anti-lock brake system (ABS) 320 from the anti-lock brake system 320 signal showing an operating state of a traction control system (TCS) 330 from the traction control system 330.

auto-cruise signal from a cruise control system 340

Here, as the line pressure PL is controlled by the controller 61, it is usually detected from an internal signal of the controller 61. The vehicle speed sensor 63 detects the vehicle speed from a rotation speed of, for example, the output shaft of the transmission 10, a drive shaft or a driving wheel.

The controller 61 computes the command value Astep to the step motor 4 on the basis of the aforesaid input signals.

Figure 3:
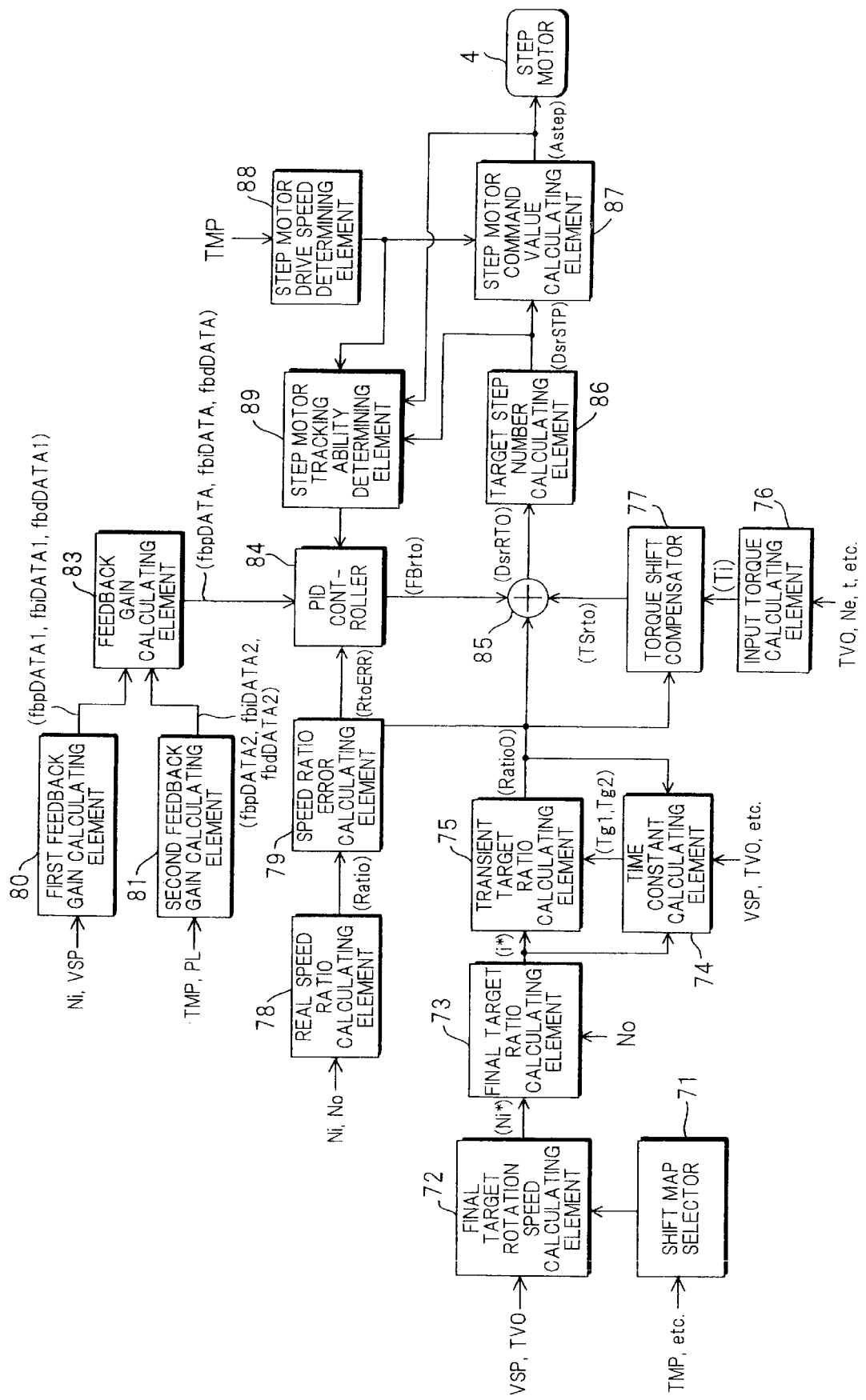
FIG. 3 is a block diagram of a controller of the speed ratio control device.

The controller 61 comprises the elements shown in FIG. 3. These elements actually comprise a computer program stored by the memory of the controller 61 or an electronic circuit of the controller 61.

Figure 4:
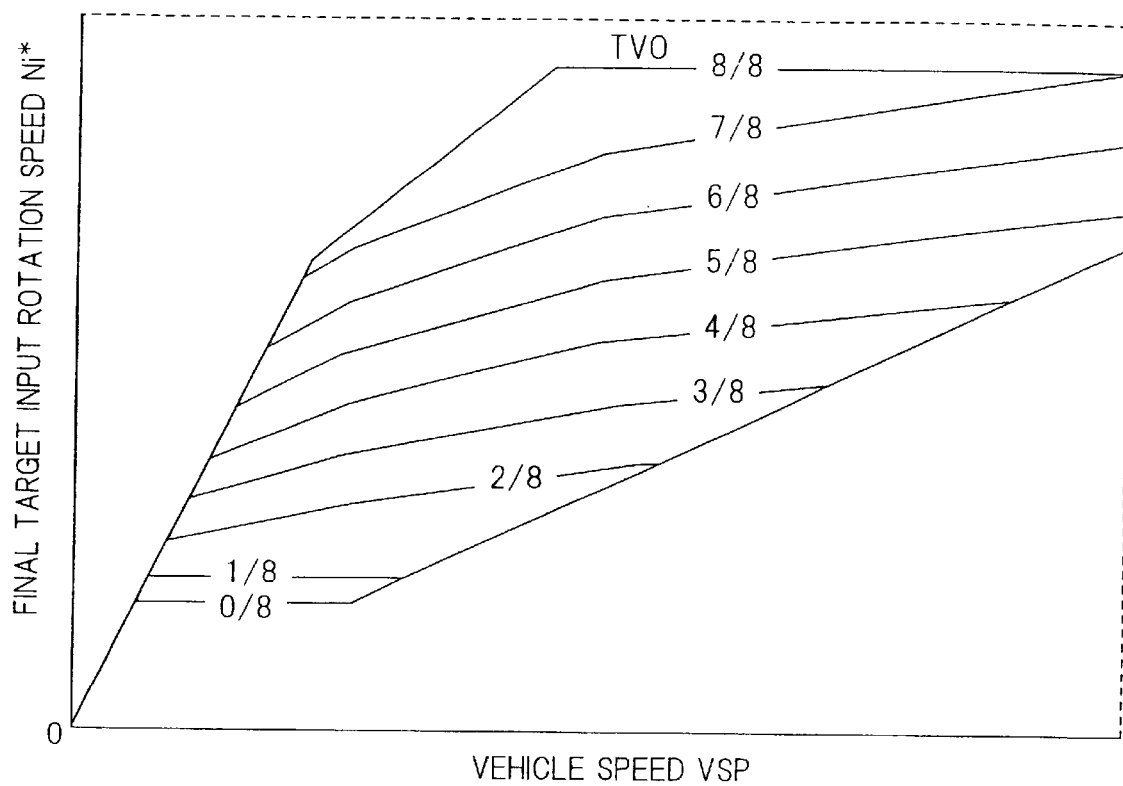
FIG. 4 is an example of a shift map used for speed change ratio control.

A shift map selector 71 selects a map to be used from among plural pre-prepared maps depending on the transmission oil temperature TMP, and whether or not an exhaust gas purification catalyst has activated. FIG. 4 is an example of a shift map.

A final target input rotation speed calculating element 72 calculates a final target input rotation speed Ni* by looking up the shift map shown in FIG. 4 based on the throttle opening TVO and vehicle speed VSP. The final target rotation speed Ni* is the target value of the input rotation speed in the steady running state.

Here, when the ABS 320 and the TCS 330 are not operating, a value VSPSEN detected by the vehicle speed sensor 63 is used as the vehicle speed VSP, and when these systems are operating, an estimated vehicle speed described hereafter VSPFL is used as the vehicle speed VSP.

A final target ratio calculating element 73 calculates a final target ratio i* by dividing the final target input rotation speed Ni* by the transmission output rotation speed No. The final target ratio i* is the target value of the speed ratio in the steady running state.

A time constant calculating element 74 determines a first speed change time constant Tg1 and second speed change time constant Tg2 used in speed change control according to the shift lever position (the normal running position "D" or sports running position "Ds", etc.), vehicle speed VSP, throttle opening TVO, engine rotation speed Ne, accelerator pedal depression rate, the torque-down signal, the anti-lock brake control signal, the traction control signal, the auto-cruise signal, and a speed ratio difference RtoERR between the real speed ratio Ratio and a transient target ratio Ratio0 described later, and computes a difference Eip between the final target ratio i* and transient target ratio Ratio0.

The first speed change time constant Tg1 and second speed change time constant Tg2 which are determined corresponding to a second order delay of the toroidal CVT 10, determine the speed change response relative to the final target ratio i*, and determine a speed change rate.

A transient target ratio calculating element 75 computes the transient target ratio Ratio0 and an intermediate speed ratio Ratio00 for bringing a real speed ratio Ratio close to the final target ratio i* with a speed response defined by the first speed change time constant Tg1 and second speed change time constant Tg2, and outputs the transient target ratio Ratio0.

An input torque calculating element 76 calculates a transmission input torque Ti. First, the input torque calculating element 76 calculates the engine output torque based on the throttle opening TVO and engine rotation speed Ne. Next, a torque ratio t of the torque converter is found based on the ratio of the input rotation speed (=Ne) and output rotation speed (=Ni) of the torque converter. Finally, the output torque of the engine is multiplied by the torque ratio t to compute the transmission input torque Ti.

A torque shift compensator 77 computes a compensation amount TSrto for compensating a torque shift (speed ratio deviation) peculiar to a toroidal CVT based on the transient target ratio Ratio0 and input torque Ti of the transmission 10.

During torque transmission, the power rollers 3 are gripped between the input disk 1 and output disk 2, so the trunnions 41 deform. Due to this deformation, the position of the precess cam 7 provided on the lower end of the trunnion 41 varies, and the characteristics of the mechanical feedback system comprising the precess cam 7 and link 8 vary resulting in the aforesaid torque shift.

As the torque shift of the toroidal CVT differs according to the transient target ratio Ratio0 and transmission input torque Ti, the torque shift compensator 77 calculates the torque shift compensation amount TSrto by looking up a predetermined two-dimensional map based on the transient target ratio Ratio0 and transmission torque Ti.

A real speed ratio calculating element 78 computes the real speed ratio Ratio by dividing the transmission input rotation speed Ni by the transmission output rotation speed No. A speed ratio error calculating element 79 subtracts the real speed ratio Ratio from the transient target ratio Ratio0 to compute the speed ratio error RtoERR (=Ratio0−Ratio).

A first feedback gain calculating element 80 computes a first proportional control feedback gain fbpDATA1, a first integral control feedback gain fbiDATA1 and a first differential control feedback gain fbdDATA1 according to the transmission input rotation speed Ni and vehicle speed VSP. The first feedback gains fbpDATA1, fbiDATA1 and fbd-DATA1 are used when a feedback correction amount FBrto is computed by PID control described later.

The first feedback gains fbpDATA1, fbiDATA1 and fbd-DATA1 are computed by looking up a predetermined two-dimensional map based on the transmission input rotation speed Ni and vehicle speed VSP.

A second feedback gain calculating element 81 computes a second proportional control feedback gain fbpDATA2, a second integral control feedback gain fbiDATA2 and a second differential control feedback gain fbdDATA2 according to the oil temperature TMP and line pressure PL of the transmission 10. The feedback gains fbpDATA2, fbiDATA2 and fbdDATA2 are also used when the feedback correction amount FBrto is computed by PID control, described later.

The second feedback gains fbpDATA2, fbiDATA2 and fbdDATA2 are computed by looking up a two-dimensional map based on the transmission oil temperature TMP and the line pressure PL.

A feedback gain calculating element 83 multiplies corresponding first feedback gains and second feedback gains so as to compute a proportional control feedback gain fbp-DATA (=fbpDATA1×fbpDATA2), an integral control feedback gain fbiDATA (=fbiDATA1×fbiDATA2), and a differential control feedback gain fbdDATA (=fbdDATA1× fbdDATA2). A PID controller 84 computes a feedback correction amount by proportional control (=RtoERR× fbpDATA), a feedback correction amount by integral control (=∫{RtoERR×fbiDATA}), and a feedback correction amount by differential control (=(d/dt){RtoERR× fbdDATA}). These three feedback correction amounts are then added to compute the feedback correction amount FBrto (=RtoERR×fbpDATA+∫{RtoERR×fbiDATA}+(d/dt) {RtoERR×fbdDATA}) under PID control.

A transient target ratio corrector 85 corrects the transient target ratio Ratio0 by the torque shift compensation amount TSrto and the speed ratio feedback correction amount FBrto, and computes a compensated transient target ratio DsrRT0 (=Ratio0+TSrto+FBrto).

A target step number calculating element 86 computes a target step number DsrSTP of the step motor 4 which realizes the compensated transient target ratio DsrRT0 by looking up a predetermined map.

When the step motor 4 cannot displace to the aforesaid target step number DsrSTP during one control cycle even at the maximum drive speed of the step motor 4 determined according to the transmission oil temperature TMP by a step motor drive speed determining element 88, a step motor command value calculating element 87 takes a position which can be realized at the maximum drive speed of the step motor 4 as the command value Astep to the step motor 4. On the other hand, when the step motor 4 can displace to the aforesaid target step number DsrSTP during one control cycle, the target step number DsrSTP is set to the command value Astep to the step motor 4.

Therefore, it can be considered that command value Astep is the actual position of the step motor 4.

The step motor 4 rotates in the direction and position corresponding to the command value Astep, displaces the sleeve 5B of the speed ratio control valve 5 by the rack and pinion, and changes the speed ratio of the CVT 10.

When the speed ratio corresponding to the command value Astep is attained, the spool 5A is returned to the neutral position relative to the sleeve 5B by mechanical feedback via the precess cam 7. Simultaneously, the power rollers 3 are returned to the position at which the rotation axis $O_1$ intersects the rotation axis $O_2$ of the disks 1 and 2. Thereby, the speed ratio command value is maintained.

A step motor tracking ability determining element 89 determines whether or not the step motor 4 can follow the target step number DsrSTP corresponding to the compensated transient target ratio DsrRT0. First, the determining element 89 calculates a step number difference ΔSTP between the target step number DsrSTP and the command value Astep which can be considered as the actual position. When the step number error ΔSTP is smaller than a value ΔSTPLIM which the step motor 4 can eliminate during one control cycle at the maximum drive speed of the step motor 4 determined as described above by the step motor drive speed determining element 88 (ΔSTP<ΔSTPLIM), the determining element 89 determines that the step motor 4 can follow the target step number DsrSTP corresponding to the compensated transient target ratio DsrRT0. Conversely, when the step number error ΔSTP is larger than the value ΔSTPLIM (ΔSTP≧ΔSTPLIM), it determines that the step motor 4 cannot follow the target step number DsrSTP.

When it is determined that the step motor 4 can follow the target step number DsrSTP corresponding to the compensated transient target ratio DsrRT0, the determining element 89 commands the PID controller 84 to continue the computing of the speed ratio feedback correction amount FBrto by the aforesaid PID control. On the other hand, when it is determined that the step motor 4 cannot follow the target step number DsrSTP, the determining element 89 commands the PID controller to maintain the speed ratio feedback correction amount ∫{EtoERR×fbiDATA} by integral control at its value at the time of the determination.

In the step motor command value calculating element 87, when the step motor 4 cannot displace to the target step number DsrSTP during one control cycle even at the maximum drive speed of the step motor 4, the position which can be realized at the maximum drive speed of the step motor 4 is taken as the command value Astep, and the command value Astep is used for the step motor tracking ability determination by the determining element 89 as the real position of the step motor 4. Hence, it is possible to know the real position of the step motor 4 when the tracking ability determination is performed from the command value Astep to the step motor 4. For this reason, it is unnecessary to actually detect the position of the step motor 4 to perform the tracking ability determination.

Further, in the step motor tracking ability determining element 89, when the step number error ΔSTF between the target step number DsrSTP and the actual drive position (=command value Astep) is smaller than the value ΔSTPLIM which is determined according to the maximum drive speed of the step motor 4 (ΔSTP<ΔSTPLIM), it is determined that the step motor 4 can follow the target step number DsrSTP corresponding to the compensated transient target ratio DsrRT0. Conversely, when the step number error ΔSTF is greater than the value ΔSTPLIM which is defined according to the maximum drive speed of the step motor 4 (ΔSTP≧ΔSTPLIM), it is determined that the step motor 4 cannot follow the target step number DsrSTP. Thus, the determination of the tracking ability of the step motor 4 can be performed precisely although the maximum drive speed of the step motor 4 varies according to the oil temperature TMP, etc.

Next, the speed ratio control performed by the controller 61 will be described referring to FIG. 5 and FIG. 6.

Figure 5:
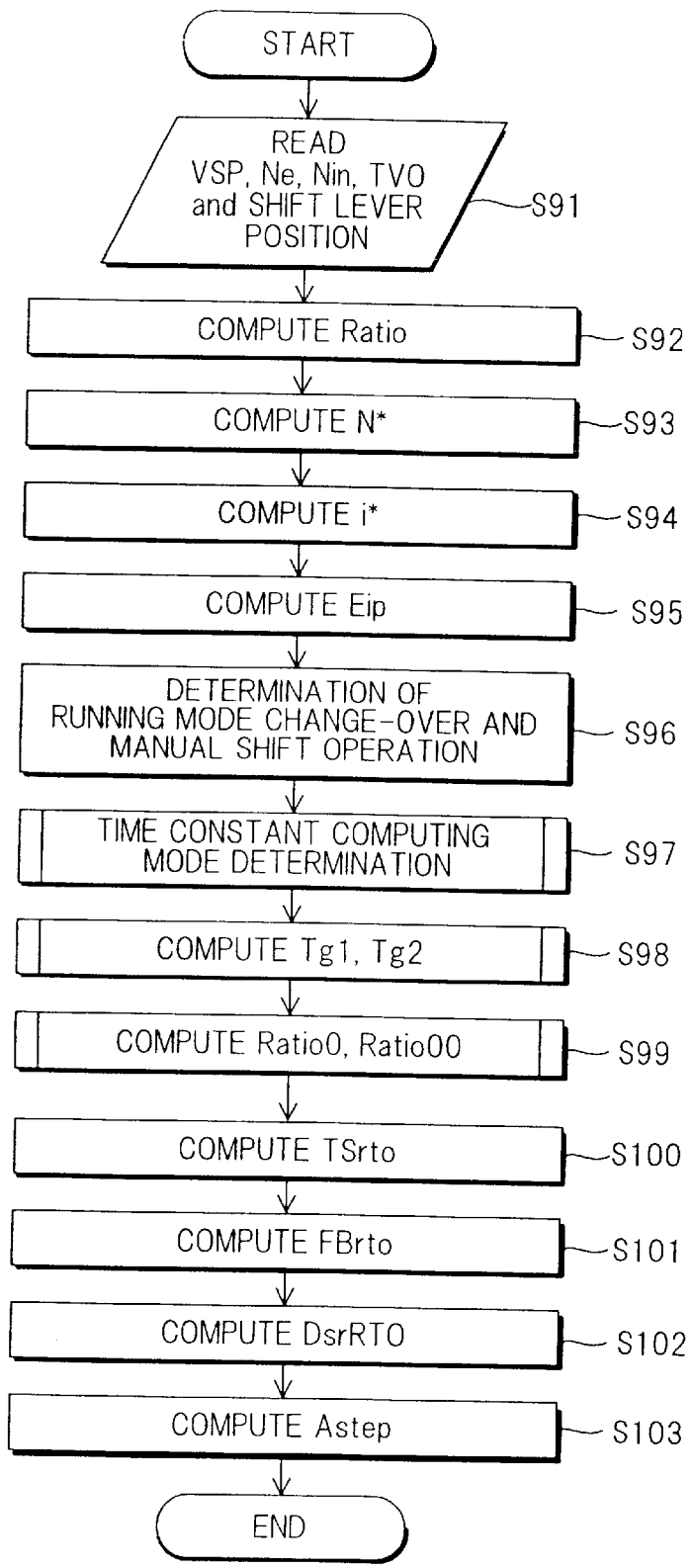
FIG. 5 is a flowchart for describing a main routine of speed change ratio control performed by the controller.

FIG. 5 shows the main routine of speed ratio control. This routine is performed at an interval of 10 milliseconds.

In a step S91, the vehicle speed VSP, engine rotation speed Ne, transmission input rotation speed Ni, throttle opening TVO and a shift lever position are read. The step S91 corresponds to processing of the time constant calculating element 74.

Here, when the ABS 320 and TCS 330 are not operating, the value VSPSEN detected by the vehicle speed sensor 63 is read as the vehicle speed VSP, and when these systems are operating, the estimated vehicle speed VSPFL described hereafter is read as the vehicle speed VSP.

In a step S92, the real speed ratio Ratio is computed by dividing the input rotation speed Ni by the transmission output rotation speed No. The step S92 corresponds to processing by the final target input rotation speed calculating element 72.

In a step S93, the final target input rotation speed Ni* is computed based on the throttle opening TVO and vehicle speed VSP by looking up the map shown in FIG. 4. The step S93 corresponds to processing by the shift map selector 71 and the final target input rotation speed calculating element 72.

In a step S94, the final target ratio i* is computed by dividing the final target input rotation speed Ni* by the transmission output rotation speed No. The step S94 corresponds to processing by the final target ratio calculating element 73.

In a step S95, the difference Eip is computed by subtracting the transient target ratio Ratio0 computed on the immediately preceding occasion the routine was performed (this is computed at the next step S99) from the final target ratio i*. The step S95 corresponds to processing by the time constant calculating element 74.

In a step S96, it is determined whether or not there has been a running mode change-over, or a manual shift operation. Specifically, it is detected whether or not there is a change-over between a power mode and a snow mode according to the signal from a mode selection switch 70. It is detected whether the shift lever is in the manual mode according to the signal from the inhibitor switch 60, and whether an upshift signal or downshift signal is detected from a manual shift switch 69. The step S96 also corresponds to processing by the time constant calculating element 74.

In steps S97, 98 and 99, the time constant computing mode is determined, and the first and second speed change time constants Tg1, Tg2, the transient target ratio Ratio0 and the intermediate speed ratio Ratio00 are computed, respectively. The steps S97, 98 and 99 also correspond to processing by the time constant calculating element 74.

In a step S100, the torque shift compensation amount TSrto is computed based on the transient target ratio Ratio0 and the transmission input torque Ti. The step S100 corresponds to processing by the torque shift compensator 77.

In a step S101, the feedback correction amount FBrto is computed by PID control. The step S101 corresponds to processing by the PID controller 84.

In a step S102, the torque shift compensation amount TSrto and feedback correction amount FBrto are added to the transient target ratio Ratio0 to compute the compensated transient target ratio DsrRT0. The step S102 corresponds to processing by the transient target ratio collector 85.

In a step S103, the command value Astep to the step motor 4 is computed. The step S103 corresponds to processing by the target step number calculating element 86 and the step motor command value calculating element 87.

Figure 6:
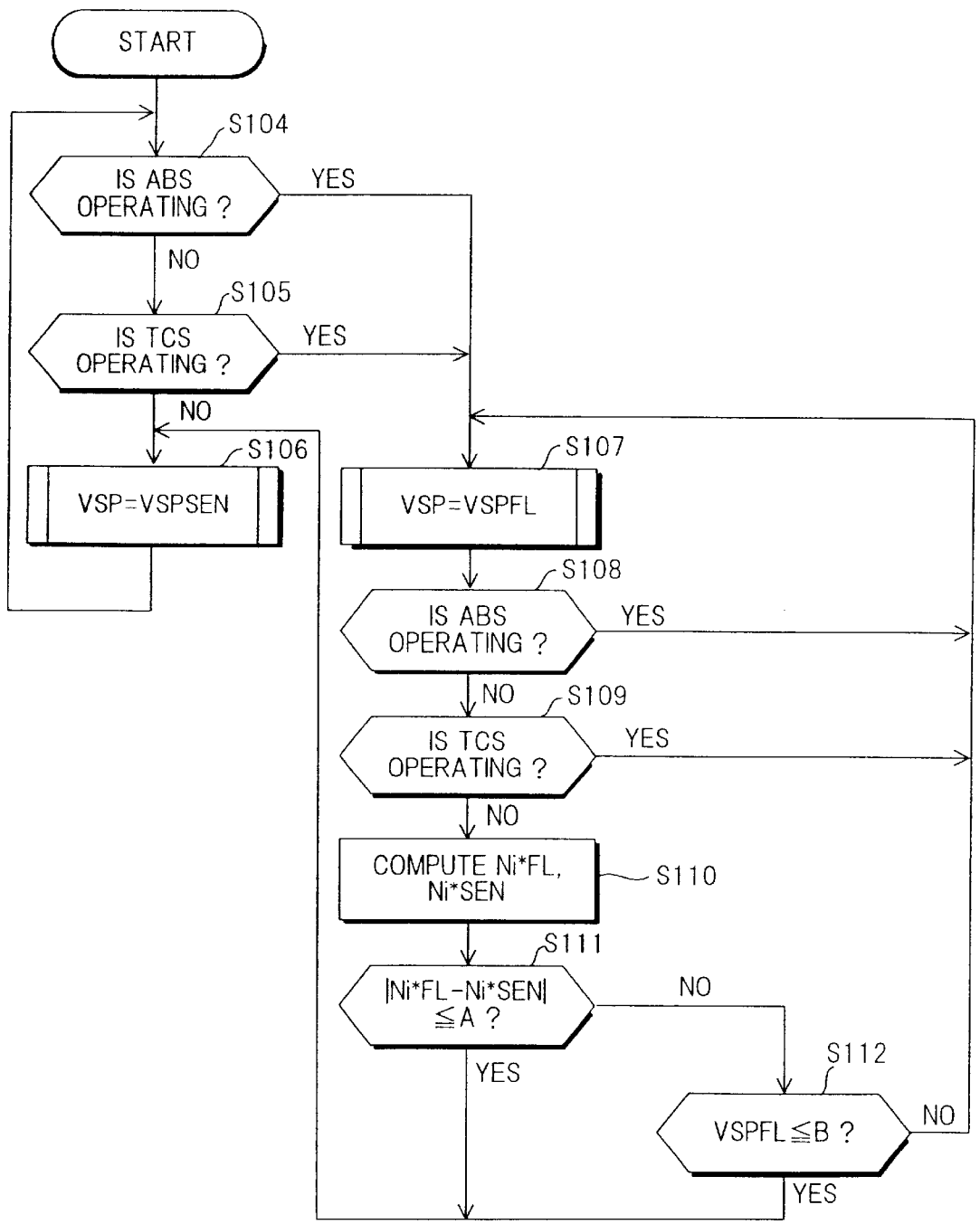
FIG. 6 is a flowchart describing a subroutine which determines a vehicle speed used for speed ratio control.

FIG. 6 shows a subroutine for determining the vehicle speed VSP used for speed ratio control. This routine corresponds to the processing of the final target input rotation speed computing element 72.

First, in a step S104, it is determined whether the ABS 320 is operating based on the signal from the ABS 320. When it is determined that is not operating, the routine proceeds to the step S105, and when it is determined that is operating, the routine proceeds to the step S107.

In the step S105, it is determined whether the TCS 330 is operating based on the signal from the TCS 330. When it is determined that it is not operating, the routine proceeds to the step S106, and when it is determined that it is operating, the routine proceeds to the step S107.

In the step S106, the vehicle speed VSPSEN detected by the vehicle speed sensor 63 is set as the vehicle speed VSP used for speed ratio control, and the routine returns to the step S104.

In the step S107, the estimated vehicle speed VSPFL is set as the vehicle speed VSP used for speed ratio control. Here, the estimated vehicle speed VSPFL is the driven wheel speed detected by the driven wheel speed sensor 58. The estimated vehicle speed VSPFL may be obtained by integrating the vehicle acceleration detected by the acceleration sensor 59.

In the step S108, it is determined whether the ABS 320 is operating based on the signal from the ABS 320. When it is determined that it is not operating, the routine proceeds to the step S109, and when it is determined that it is operating, the routine proceeds to the step S107.

In the step S109, it is determined whether the TCS 330 is operating based on a signal from the TCS 330. When it is determined that it is not operating, the routine proceeds to the step S110, and when it is determined that it is operating, the routine proceeds to the step S107.

In the step S110, the final target input rotation speed NI*FL is computed by looking up the map shown in FIG. 4 based on the throttle opening TVO and estimated vehicle speed VSPFL. The final target input rotation speed Ni*SEN is also computed by looking up the map shown in FIG. 4. based on the throttle opening TVO and sensor detected vehicle speed VSPSEN.

In the step S111, it is determined whether the difference between the final target input rotation speed NI*FL computed using the estimated vehicle speed VSPFL and the final target input rotation speed NI*SEN computed using the sensor detected vehicle speed VSPSEN, is smaller than a predetermined threshold A. The maximum speed ratio variation amount permissible for the passengers when the speed ratio varies due to a change-over of the vehicle speed VSP used for speed ratio control from the estimated vehicle speed VSPFL to the sensor detected vehicle speed VSPSEN is found from experiment, and the rotation speed difference corresponding to this maximum value is set to the threshold A.

When it is determined in the step S111 that the difference is smaller than the threshold A, the routine proceeds to the step S106, and the vehicle speed VSP used for speed ratio control is changed over from the estimated vehicle speed VSPFL to the sensor detected vehicle speed VSPSEN. When it is determined in the step S111 that the difference is larger than the threshold A, the routine proceeds to the step S112.

In the step S112, it is determined whether or not the estimated vehicle speed VSPFL is smaller than a threshold B. Herein, the minimum value of the vehicle speed VSP used for speed ratio control (i.e., lower limit of VSP) is set to the threshold B. When it is determined in the step S112 that the estimated vehicle speed VSPFL is smaller than the threshold B, the routine proceeds to the step S106, and the vehicle speed VSP used for speed ratio control is changed over from the estimated vehicle speed VSPFL to the sensor detected vehicle speed VSPSEN. When it is determined in the step S112 that the estimated vehicle speed VSPFL is larger than the threshold B, the routine proceeds to the step S107.

Therefore, when both the ABS 320 and TCS 330 are not operating, the routine proceeds from the step S104 to the steps S105, S106 and in the step S106, the sensor detected vehicle speed VSPSEN is set to the vehicle speed VSP used for speed ratio control.

When the ABS 320 or TCS 330 starts operating, the routine proceeds from the step S104 to the step S107, or from the step S104 to the steps S105, 107, and the estimated vehicle speed VSPFL is set to the vehicle speed VSP used for speed ratio control.

While the ABS 320 or TCS 330 is operating, the steps S107, S108 or the steps S107, S108 and S109 are repeated, and the estimated vehicle speed VSPFL continues to be used for speed ratio control.

When both the ABS 320 and TCS 330 stop, the routine proceeds from the step S107 to the steps S108, S109, S110, S111, and in the step S111, it is determined whether the absolute value of the difference between the final target input rotation speed Ni*FL and final target input rotation speed Ni*SEN is smaller than the threshold A. When it is determined that the absolute value of this difference is larger than the threshold A, the routine proceeds to the steps S112, S107. Until it is determined that it is smaller than the threshold A, the processing from the step S107 to the step S111 is repeated.

When it is determined in the step S111 that the absolute value of the difference is smaller than the threshold A, the routine proceeds to the step S106, and the sensor detected vehicle speed VSPSEN is set to the vehicle speed VSP used for speed change control.

Even when the absolute value of the difference is larger than the threshold A in the step S111, if it is determined that the estimated vehicle speed VSPFL is smaller than the threshold B, the routine proceeds to the step S106, and the sensor detected vehicle speed VSPSEN is set to the vehicle speed VSP used for speed change control.

As described above, according to this embodiment, when the ABS 320 or TCS 330 start operating, the vehicle speed VSP used for speed change control is immediately changed over from the sensor detected vehicle speed VSPSEN to the estimated vehicle speed VSPFL. As a result, speed ratio fluctuations occurring when the sensor detected vehicle speed VSPSEN is used for speed ratio control are suppressed, and decrease of the slip suppression effect due to the ABS 320 or TCS 330 is prevented.

Further, when the ABS 320 or TCS 330 stops, the vehicle speed VSP used for speed change control is not always immediately changed over from the estimated vehicle speed VSPFL to the sensor detected vehicle speed VSPSEN. It is changed over when the speed ratio variation amount is less than the permissible value. Due to this, a sharp variation of the speed ratio when the ABS 320 or TCS 330 stops is suppressed, and shocks or recurrence of slip due to a sharp variation of speed ratio are prevented.

The determination of whether or not to change over the vehicle speed used for speed change control to the sensor detected vehicle speed VSPSEN, is performed by determining whether or not the absolute value of the difference between the final target input rotation speed NI*FL computed based on the estimated vehicle speed VSPFL, and the final target input rotation speed Ni*SEN computed based on the sensor detected vehicle speed VSPSEN, is smaller than the threshold A corresponding to the maximum permissible amount of speed ratio variation. Therefore, it can easily be determined whether the speed ratio variation amount is less than the permissible amount simply by setting the threshold A.

It can also be determined whether to change over to the sensor detected vehicle speed VSPSEN by comparing the difference of the sensor detected vehicle speed VSPSEN and estimated vehicle speed VSPFL with a threshold. In this case, however, the speed ratio variation amount due to this factor is different depending on whether the vehicle is running at high speed or at low speed even for the same speed difference, so plural threshold values must be set according to the vehicle speed or by using a predetermined function.

Also, even if it is determined that the difference between Ni*FL and Ni*SEN is larger than the threshold A, if it is determined that the estimated vehicle speed VSPFL is smaller than the threshold B, the vehicle speed used for speed change control is changed over to the sensor detected vehicle speed VSPSEN. The reason for performing the change-over in this case is that, to prevent speed change control from becoming unstable at very low running speeds when the precision of detecting the vehicle speed is low, the vehicle speed VSP used for speed change control is limited by the threshold B (lowest vehicle speed), so the vehicle speed VSP used for speed change control is never less than the threshold B. Further, when the vehicle is running in the vicinity of the lowest vehicle speed, the final target speed ratio is the same (=maximum speed ratio) whether the final target speed ratio is computed based on the sensor detected vehicle speed VSPSEN or the estimated vehicle speed VSPFL, so a sharp variation of speed ratio due to change-over of vehicle speed used for speed change control does not occur even if there is some difference between the sensor detected vehicle speed VSPSEN and the estimated vehicle speed VSPFL.

Due to the above change-over, the vehicle speed VSP used for speed change control can be changed over to the sensor detected vehicle speed VSPSEN promptly after the ABS or TCS have stopped operating while occurrence of shock and recurrence of slip are prevented.

This invention is not limited to the above embodiments, and may also be applied for example to the speed ratio control of a V-belt CVT.

The vehicle speed used for speed change control is changed over based on the operating state of ABS or TCS in the above embodiment. However, the vehicle speed used for speed change control may be changed over based on the operating state of a vehicle dynamics controller (VDC) which controls the vehicle behavior, and the present invention also be applied to this case The entire contents of Japanese Patent Applications P11-280362 (filed Sept. 30, 1999) and P-11-280363 (filed Sept. 30, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. A speed ratio control device used for a vehicle comprising a continuously variable transmission and a slip control system which controls a slip of a driving wheel by controlling either of braking force and driving force, the control device comprising:

a sensor which detects a vehicle speed;

an actuator which changes a speed ratio of the transmission; and a microprocessor programmed to:
estimate a vehicle speed based on a running state;
compute a target speed ratio of the transmission based on the sensor detected vehicle speed when the slip control system is not operating;
compute the target speed ratio of the transmission based on the estimated vehicle speed when the slip control system is operating;
control the actuator so that the speed ratio of the transmission approaches the target speed ratio; and
determine whether, when the slip control system has stopped, a speed ratio variation amount due to changing the vehicle speed used for speed change control from the estimated vehicle speed to the sensor detected vehicle speed, is less than a permissible amount, and when it is determined that the speed ratio variation amount is less than the permissible amount, changing the vehicle speed used for speed change control from the estimated vehicle speed to the sensor detected vehicle speed.

2. A speed ratio control device as defined in claim 1, wherein the microprocessor is further programmed to:
change the vehicle speed used for speed change control from the sensor detected vehicle speed to the estimated vehicle speed simultaneously when the slip control system starts operating.

3. A speed ratio control device as defined in claim 1, wherein the microprocessor is further programmed to:
determine that the speed ratio variation amount is less than the permissible amount when the absolute value of the difference between the target speed ratio computed based on the estimated vehicle speed, and the target speed ratio computed based on the sensor detected vehicle speed, is less than a predetermined threshold.

4. A speed ratio control device as defined in claim 1, wherein the microprocessor is further programmed to:
determine that the speed ratio variation amount is less than the permissible amount when the absolute value of the difference between the target input rotation speed computed based on the estimated vehicle speed, and the target input rotation speed computed based on the sensor detected vehicle speed, is less than a predetermined threshold.

5. A speed ratio control device as defined in claim 1, wherein the microprocessor is further programmed to:
determine whether the estimated vehicle speed is less than a minimum value of vehicle speed used for speed change control; and
change the vehicle speed used for speed ratio control from the estimated vehicle speed to the sensor detected vehicle speed when it is determined that the estimated vehicle speed is less than the minimum value, even when the speed ratio variation amount is not less than the permissible amount.

6. A speed ratio control device used for a vehicle comprising a continuously variable transmission and a slip control system which controls a slip of a driving wheel by controlling either of braking force and driving force, the controller comprising:

means for detecting a vehicle speed;

an actuator which changes a speed ratio of the transmission;

means for estimating the vehicle speed based on a running state;

means for computing a target speed ratio of the transmission based on the sensor detected vehicle speed when the slip control system is not operating;

means for computing the target speed ratio of the transmission based on the estimated vehicle speed when the slip control system is operating;

means for controlling the actuator so that the speed ratio of the transmission approaches the target speed ratio; and means for determining whether, when the slip control system has stopped, a speed ratio variation amount due to changing the vehicle speed used for speed change control from the estimated vehicle speed to the sensor detected vehicle speed, is less than a permissible amount, and when it is determined that the speed ratio variation amount is less than the permissible amount, changing the vehicle speed used for speed change control from the estimated vehicle speed to the sensor detected vehicle speed.

* * * * *